(12) United States Patent
Schröferl et al.

(10) Patent No.: US 11,247,547 B2
(45) Date of Patent: Feb. 15, 2022

(54) VEHICLE ROOF COVER HAVING A FRAME PART

(71) Applicant: Webasto SE, Stockdorf (DE)

(72) Inventors: Thomas Schröferl, Stockdorf (DE); Marcel Mihál, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/967,080

(22) PCT Filed: Mar. 19, 2019

(86) PCT No.: PCT/EP2019/056779
§ 371 (c)(1),
(2) Date: Aug. 3, 2020

(87) PCT Pub. No.: WO2019/179982
PCT Pub. Date: Sep. 26, 2019

(65) Prior Publication Data
US 2021/0031607 A1 Feb. 4, 2021

(30) Foreign Application Priority Data

Mar. 23, 2018 (DE) .................... 10 2018 002 408.4

(51) Int. Cl.
*B60J 10/00* (2016.01)
*B60J 10/82* (2016.01)
(Continued)

(52) U.S. Cl.
CPC ............ *B60J 10/82* (2016.02); *B60J 7/0435* (2013.01); *B60J 10/15* (2016.02); *B60J 10/34* (2016.02);
(Continued)

(58) Field of Classification Search
CPC ... B60J 10/90; B60J 10/80; B60J 10/82; B60J 10/50
(Continued)

(56) References Cited

U.S. PATENT DOCUMENTS 8,839,589 B2 * 9/2014 Emer ................. B60J 10/18
52/717.01
2006/0152043 A1 7/2006 Bonneau
(Continued)

FOREIGN PATENT DOCUMENTS

DE 19939978 A1 1/2001
DE 10203846 A1 8/2003
(Continued)

OTHER PUBLICATIONS

International Search Report for PCT/EP2019/056779 dated Jun. 26, 2019 in English and German (19 pages).
(Continued)

*Primary Examiner* — Dennis H Pedder
(74) *Attorney, Agent, or Firm* — Fitch, Even, Tabin & Flannery, LLP

(57) ABSTRACT

A cover for closing a vehicle surface opening is provided which has a frame part secured to the underside of the cover on one side at a frame part securing section by an application of plastic foam on the cover, and which contacts the underside of the cover on the other side at a free section of the frame part via at least one spacer. The frame part may also include at least one filling opening on the free section thereof for introducing a reactive plastic material forming the spacer, and the plastic material introduced through the filling opening into a gap between the free section of the frame part secured to the cover and the underside of the cover retains
(Continued)

the free section of the frame on the underside of the cover in a positioned and/or fixed manner as a spacer after reacting or curing.

14 Claims, 4 Drawing Sheets

(51) Int. Cl.
*B60J 10/15* (2016.01)
*B60J 10/34* (2016.01)
*B60J 10/50* (2016.01)
*B60J 10/90* (2016.01)
*B60J 7/043* (2006.01)

(52) U.S. Cl.
CPC .............. *B60J 10/45* (2016.02); *B60J 10/50* (2016.02); *B60J 10/90* (2016.02)

(58) Field of Classification Search
USPC .................................................. 296/216.09
See application file for complete search history.

(56) References Cited

U.S. PATENT DOCUMENTS

| | | |
|---|---|---|
| 2008/0272625 A1 | 11/2008 | Paetz et al. |
| 2010/0276969 A1 | 11/2010 | Auchter-Bruening |
| 2013/0038091 A1 | 2/2013 | Schroferl |
| 2015/0283948 A1* | 10/2015 | Oppliger ................. B60R 5/044 |
| | | 296/24.43 |
| 2018/0236854 A1* | 8/2018 | Hortrich .................. B60J 7/022 |

FOREIGN PATENT DOCUMENTS

| | | |
|---|---|---|
| DE | 102004007988 A1 | 8/2005 |
| DE | 102014114414 A1 | 4/2016 |
| EP | 1310394 A1 | 5/2003 |
| EP | 2528803 A1 | 12/2012 |
| JP | 11 170927 A | 6/1999 |
| WO | 2012123309 A1 | 9/2012 |

OTHER PUBLICATIONS

International Preliminary Report on Patentability for PCT/EP2019/056779 dated Sep. 29, 2020, in English (6 pages).

* cited by examiner

VEHICLE ROOF COVER HAVING A FRAME PART

CROSS-REFERENCE TO RELATED APPLICATIONS

This application is a U.S. national phase application filed under 35 U.S.C. § 371 of International Application No. PCT/EP2019/056779, filed 19 Mar. 2019, designating the United States, which claims priority from German Patent Application No. 10 2018 002 408.4, filed 23 Mar. 2018, which are hereby incorporated herein by reference in their entirety for all purposes.

FIELD

The invention relates to a cover for closing a vehicle surface opening, wherein the cover has a frame part which, on one side, is fixed to the cover bottom side at a frame part fixing portion by means of a plastic foamed-on structure which is attached to the cover, and, on the other side, makes contact with the cover bottom side at a frame part free portion via at least one spacer.

BACKGROUND

DE 10 2014 114 414 A1 discloses a cover of the generic type, which is formed by a glass pane and has a metallic support part or frame part, arranged on the cover bottom side, which is embedded in a plastic foam encapsulation on the cover edge side and is thus fixed to the cover. A spacer, which is intended to prevent the transmission of vibrations between the frame part and the cover, is provided between a cover-inward portion of the frame part, which is located outside the plastic foam encapsulation and has a downwardly curved limb for the coupling e.g. of an actuating mechanism of the cover, and the cover. The spacer is formed from a plastic layer or a plastic bead, which is deposited onto the frame part and/or the cover by means of an applying device before the frame part and the cover are received in a foaming tool with the spacer(s) situated in between and are encapsulated by the plastic foam encapsulation.

One disadvantage of the production of said cover lies in the fact that, during handling of the frame part and during insertion into the foaming tool, the plastic bead can contaminate other components or can itself become crushed and can become impaired in its required configuration.

SUMMARY

The invention is therefore based on the object of providing a cover mentioned at the beginning which is improved with respect to the attachment of the frame part to the cover.

Said object is achieved according to the invention in the case of the cover mentioned at the beginning in that, on its frame part free portion, the frame part contains at least one filling opening for the introduction of a reactive plastic material which forms the spacer, and in that, after it has been fully reacted or cured, the plastic material, which has been introduced through the filling opening into a gap between the frame part free portion of the frame part fixed to the cover and the cover bottom side, holds the frame part free portion in a positioned and/or fixed manner on the cover bottom side as a spacer.

Advantageous configurations of the invention are specified in the dependent claims.

Since, in the case of the cover according to the invention, the spacer is produced after the frame part has been attached to the cover by means of the foamed-on structure, the handling of the frame part, which does not yet contain any sensitive reactive plastic material, during insertion into the foaming tool is simplified.

The frame part free portion, on which the at least one spacer is formed and to which it is attached, is that portion of the frame part which extends cover-inwardly from the external or outer edge-side frame part fixing portion embedded in the foamed-on structure, and which thus extends outside the foamed-on structure. The spacer suppresses or prevents oscillations or vibrations of said frame part free portion, which is in particular otherwise not directly connected to the cover, in relation to the cover. To this end, the spacer is provided to position, and in particular hold in its position, the frame part free portion on the cover bottom side when the cover is pushed against the frame part free portion by the action of force or by a load. The spacer can also fasten the frame part free portion to the cover bottom side, e.g. by way of an adhesive bond, in such a manner that the frame part free portion cannot be removed from the cover bottom side.

The plastic material forming the spacer is introduced into the gap in a preferably viscoplastic, reactive state, e.g. by means of a nozzle, in a simple manner through the respective filling opening in the amount that ensures the size of the spacer is sufficient for the respective height of the gap. The fed-in or injected-in plastic material expands in and behind the filling opening and bears both against the cover inner side and also against the frame part or the frame part free portion.

The plastic material is, for example, an adhesive, a foam material or an injection molded material. Depending on the plastic material used, after it has been fully reacted or cured, the spacer can have a certain bondability such that it adheres or adhesively bonds to the cover as well as to the frame part free portion. On the other side, the spacer can be formed at the filling opening in such a manner that it is held thereon without an adhesive bond and only in a form-fitting manner, although it can additionally also adhere if desired.

The spacer thus expediently holds the frame part or the frame part free portion at that spacing from the cover inner side or cover bottom side which is predefined by the position of the frame part on account of its fixing by means of the foamed-on structure.

The spacer can be formed in a punctiform manner at the for example round filling opening. The filling opening can also be formed as elongate and in particular as a slot, and therefore the spacer can also be formed correspondingly as elongate or as a bead. In principle, substantially any desired opening cross sections are suitable for the filling openings. In particular, the fed-in plastic material fills only a region closely surrounding the filling opening. Extensive fixing, which covers a large area of the frame part free portion, on the cover inner side is expediently not provided, since a delimited size and extent of the plastic material or of the spacer is sufficient to avoid vibrations. A small amount of plastic material is therefore sufficient.

It is expediently possible for a plurality of filling openings, which are arranged, for example, spaced apart from one another in a straight line or else in a different arrangement which can follow e.g. the form of the frame part, to be provided on the frame part or the frame part free portion. Filling openings which are configured in the same way, or else differently e.g. with respect to size and/or form, can be provided here.

According to one preferred embodiment, it is provided that the filling opening is formed in a depression or bulge, that is remote from the cover bottom side, of the frame part free portion. In the case of a small spacing or gap between the frame part free portion and the cover inner side, the depression can receive an amount of plastic material that is sufficient in particular with respect to the gap thickness in order to form the spacer, and can in particular laterally delimit said plastics material. The depression is expediently adapted to the form of the filling opening and has e.g. a round form, but can also have an elongate or groove-like configuration and form an in particular elongate reservoir for the plastic material. A plurality of individual depressions can be provided corresponding to the positions of a plurality of filling openings on the frame part.

The spacer can be formed from a layer of the plastic material or from a plurality of layers 22 (See e.g., FIG. 4) of the plastic material. A multi-layer structure of the spacer can combine the same or different plastic materials and enable specific configurations of the spacer.

In particular in the longitudinal direction of the frame, the frame part can have a plurality of frame part free portions with respectively at least one filling opening. The frame part expediently forms respectively one of the two oppositely situated longitudinal sides of a reinforcing or cover frame which is attached to the cover bottom side and produced in particular from a metallic material. However, the frame part can also form other portions of a cover frame, such as e.g. the transverse portions of the cover frame.

The frame part expediently contains a mounting receptacle for an adjusting device of the cover, in particular on a web of the frame part free portion. The cover is in particular a cover of an openable vehicle roof, such as a tilt-and-slide roof or a spoiler roof, but can also be provided for the purposes of closing a window opening or a rear window opening or the like.

BRIEF DESCRIPTIONS OF THE DRAWINGS

The invention is explained in more detail below on the basis of one exemplary embodiment of a cover according to the invention with reference to the drawing, in which.

DETAILED DESCRIPTION

Figure 1:
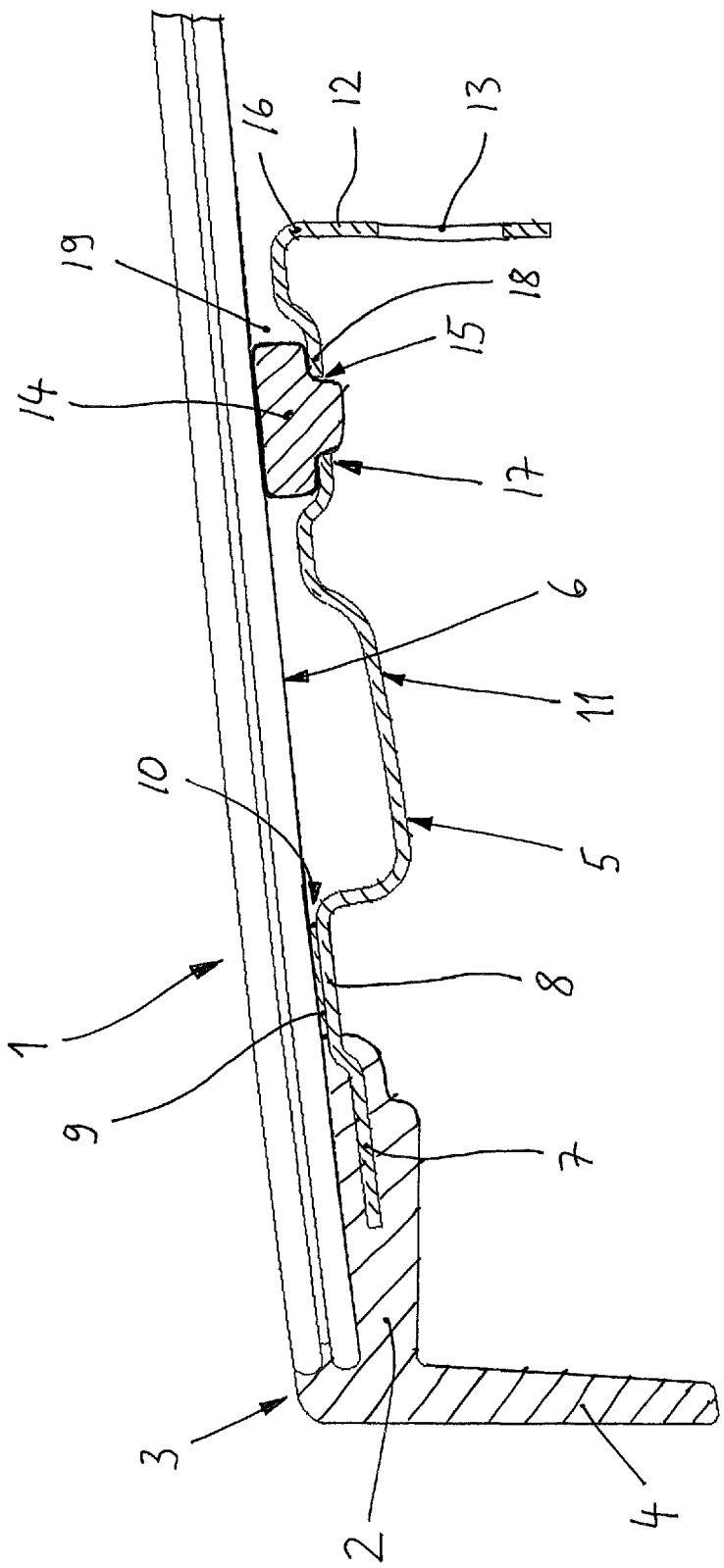
FIG. 1 shows a lateral portion of a cover of a vehicle roof with a frame part attached to the cover bottom side in a cross-sectional view.
Figure 2:
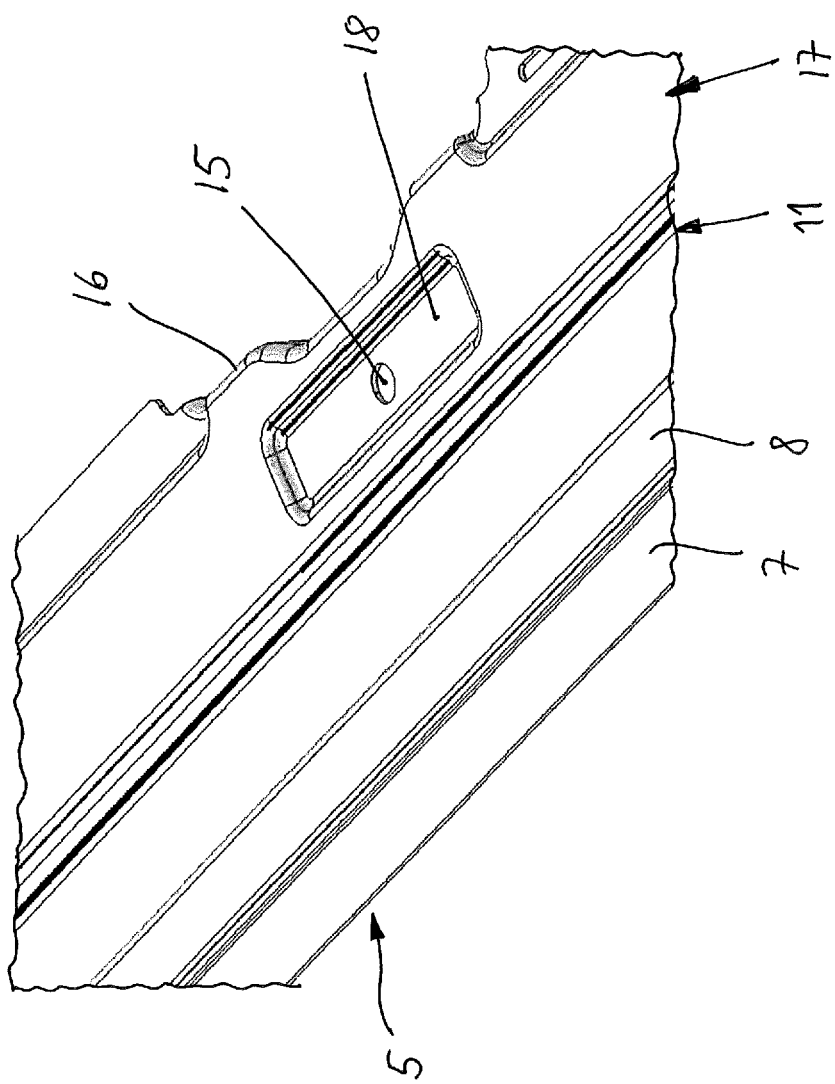
FIG. 2 shows a portion of the frame part in an isometric view.

A cover 1 of an openable vehicle roof of a vehicle, such as e.g. a passenger car, is provided for example for closing a roof opening and can be raised out of a closed position, which closes the roof opening, and can be adjusted or pivoted out e.g. at least into a ventilation position. The cover 1 is for example a cover of a tilt-and-slide roof, a spoiler roof or an externally guided sliding roof and is in particular a glass cover or produced from a transparent plastic.

On the edge side, the cover 1 has a foamed-on structure 2 as a plastic frame or plastic enclosure, which foamed-on structure is formed in particular from polyurethane (PU), is formed preferably in an encircling manner on the cover 1 and is expediently formed with a downwardly projecting screen 4 at each of the two longitudinally running side edges 3 of the cover 1.

An elongate frame part 5 is arranged on the cover inner side or cover bottom side 6 so as to run inwardly from the lateral cover edge 3 and along the cover edge 3. A frame part fixing portion 7, which is on the outside, of the frame part 5 is embedded in the foamed-on structure 2 and fixed to the cover bottom side 6 by means of the foamed-on structure 2. A contact portion 8 of the frame part 5 adjoins the frame part fixing portion 7 inwardly in a transverse direction and bears against the cover bottom side 6 with a seal 9, such as e.g. a microcellular rubber layer, in between. In the foaming tool, during the foaming of the foamed-on structure 2, the seal 9 seals off a narrow gap 10 between the contact portion 8 and the cover bottom side 6 and thus prevents foam of the foamed-on structure 2 from escaping through this gap 10.

Furthermore, adjoining the contact portion 8, the frame part 5 has a frame part free portion 11 which is expediently spaced apart from the cover inner side 6 and which preferably ends in a web 12, which extends in a manner directed away from the cover 1 and on which is formed a receptacle 13, such as for example an opening, for a mounting or actuating device of the cover 1, such as e.g. a deployment mechanism.

Provided on the frame part 5 is at least one spacer 14, which holds the frame part free portion 11 of the frame part 5 at a spacing from the cover bottom side 6. On one side, the spacer 14 is arranged in the region of a filling opening 15 of the frame part 5, which filling opening is preferably arranged close to the inner edge 16 of the frame part 5 in a spacer frame portion 17 which is spaced apart from the cover bottom side 6. The filling opening 15 is formed e.g. as round or elongate in the longitudinal direction of the frame part 5 and is arranged e.g. in a round or elongate depression 18 of the frame part 5 or of the spacer frame portion 17, which depression is formed as a bulge remote from the cover bottom side 6. The spacer 14 is a plastic part which is foamed or injection molded from a plastic material, such as e.g. from polyurethane or an adhesive. The spacer 14 is formed by introducing or injecting a plastic compound or adhesive through the filling opening 15 in a gap 19 between the frame part 5 and the cover bottom side 6. The introduced reactive plastic material comes to lie against the cover inner side 6 and the spacer frame portion 17 and partially, largely or completely fills the depression 18. The depression 18 thus delimits the expansion of the introduced plastic material. Depending on the plastic material used, after the plastic material has been fully reacted or cured, the spacer 14 is held in a form-fitting manner at the filling opening 15 and can additionally adhere or be adhesively bonded to the cover inner side 6 and the spacer frame portion 17 if the plastic material has a corresponding adhesive property. The spacer 14 damps vibrations of the frame part free portion 11 in relation to the cover 1 or prevents such vibrations from occurring.

Figure 3:
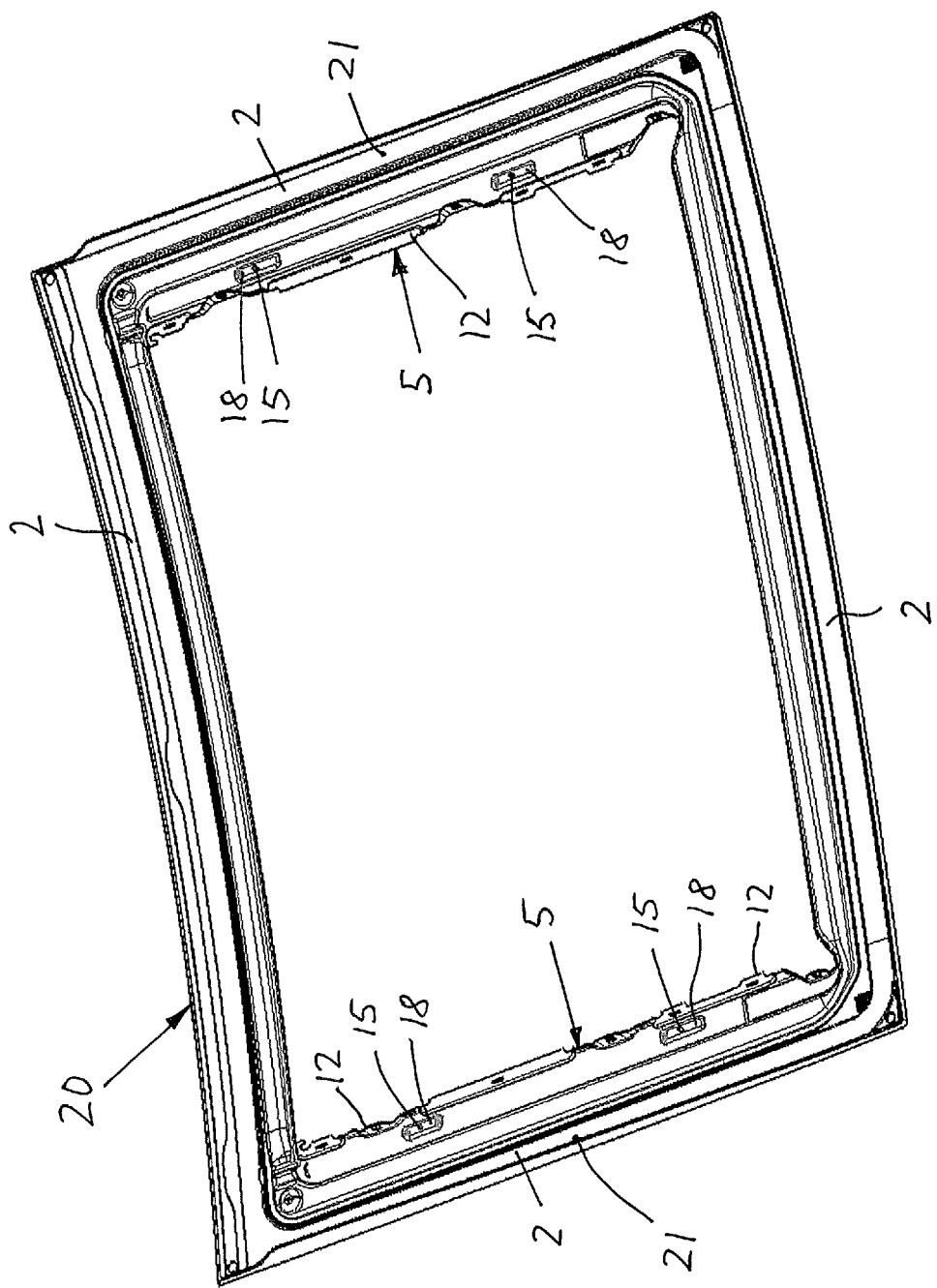
FIG. 3 shows a view from below of a cover frame of the cover which has a frame part on each of its two lateral longitudinal frame portions in an isometric view.
Figure 4:
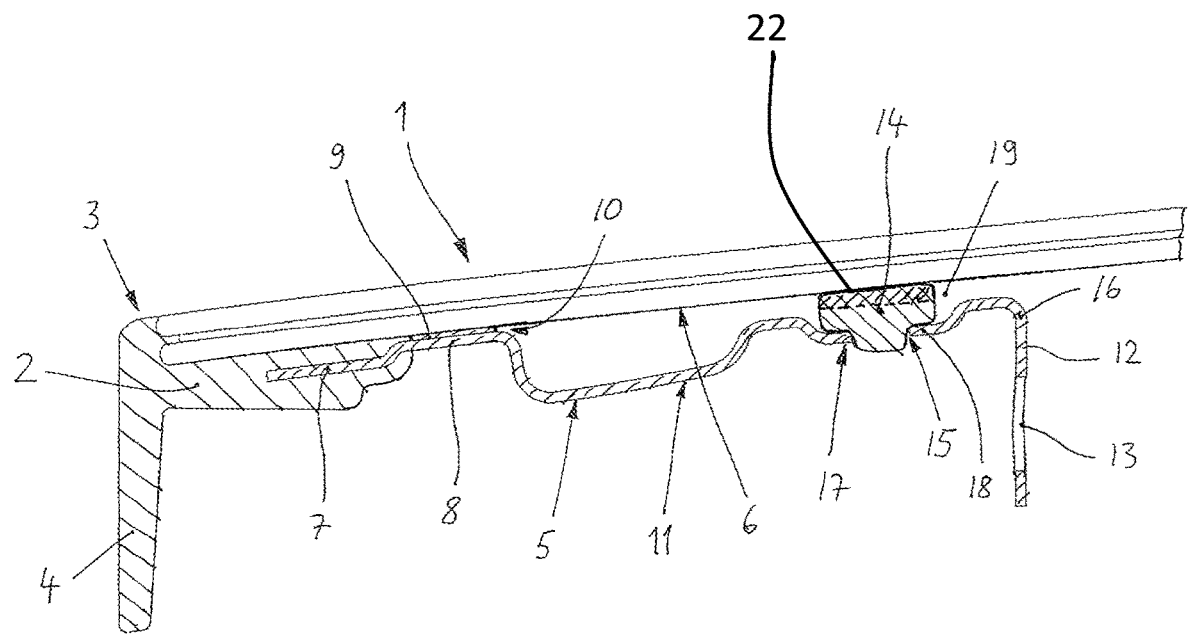
FIG. 4 shows a lateral portion of a cover of a vehicle roof with a frame part attached to the cover bottom side in a cross-sectional view having a spacer formed from a plurality of layers.

FIG. 3 shows the foamed-on structure 2 configured as a plastic frame 20 which is molded in an encircling manner on the cover inner side or cover bottom side 6 of the cover 1 (the cover is not illustrated) and to the two longitudinal portions 21 of which respectively the frame part 5 is fixed. In this exemplary embodiment, each frame part 5 has two filling openings 15 in associated depressions 18. The frame parts 5 which are produced in particular from a metallic material can be integrated separately in the plastic frame 20 or are parts or portions of an encircling reinforcing frame.

The individual features of the invention which are disclosed in the description and with reference to the exemplary embodiment as well as in the figures can be combined in any desired technically expedient arrangements and configurations with the subject matter of the invention in its general form.

| List of reference signs | |
|---|---|
| 1 | Cover |
| 2 | Foamed-on structure |
| 3 | Side edge |
| 4 | Screen |
| 5 | Frame part |
| 6 | Cover bottom side |
| 7 | Frame part fixing portion |
| 8 | Contact portion |
| 9 | Seal |
| 10 | Gap |
| 11 | Frame part free portion |
| 12 | Web |
| 13 | Receptacle |
| 14 | Spacer |
| 15 | Filling opening |
| 16 | Inner edge |
| 17 | Spacer frame portion |
| 18 | Depression |
| 19 | Gap |
| 20 | Plastic frame |
| 21 | Longitudinal portion |
| 22 | plurality of spacer layers |

The invention claimed is:

1. A cover for closing a vehicle surface opening,
wherein the cover has a frame part which, on one side, is fixed to the cover bottom side at a frame part fixing portion by a plastic foamed-on structure which is attached to the cover, and,
on an other side, makes contact with the cover bottom side at a frame part free portion spaced from the bottom side via at least one spacer,
wherein, on its frame part free portion, the frame part contains at least one filling opening for the introduction of a reactive plastic material which forms the spacer and in that,
after it has been fully reacted or cured, the plastic material, which has been introduced through the filling opening into a gap between the frame part free portion of the frame part fixed to the cover and the cover bottom side, holds the frame part free portion in a positioned and/or fixed manner on the cover bottom side,
wherein the spacer is formed as rounded or elongate or as a bead.

2. The cover of claim 1, wherein the spacer holds the frame part free portion in its entirety at a spacing from the cover bottom side.

3. The cover of claim 1, wherein the spacer is formed from a layer of the plastic material or from a plurality of layers of the plastic material.

4. The cover of claim 1, wherein the plastic material is an adhesive, a foam material or an injection molded material.

5. The cover of claim 1, wherein the filling opening is formed in a depression, that is remote from the cover bottom side, of the frame part free portion.

6. The cover of claim 5, wherein the depression forms an elongate reservoir for the plastic material.

7. The cover of claim 5, wherein the depression represents a boundary for the plastic material forming the spacer.

8. The cover of claim 1, wherein the spacer is held in a form-fitting manner at the filling opening.

9. The cover of claim 1, wherein the spacer is a damping element for damping vibrations of the frame part free portion.

10. The cover of claim 1, wherein the frame part free portion has no other fixing connection to the cover bottom side.

11. The cover of claim 1, wherein in the longitudinal direction of the frame, the frame part has a plurality of frame part free portions with respective filling openings.

12. The cover of claim 1, wherein the frame part forms respectively one of the two oppositely situated longitudinal portions of a cover frame which is attached to the cover bottom side.

13. The cover of claim 1, wherein the frame part has a mounting receptacle for an adjusting device of the cover and the cover is a cover of an openable vehicle a tilt-and-slide roof or a spoiler roof.

14. The cover of claim 1, wherein the spacer is formed by plastic material which fills only a region closely surrounding the filling opening.

* * * * *